United States Patent Office 3,251,799
Patented May 17, 1966

3,251,799
LACTAM POLYMERIZATION, HETEROCYCLIC PROMOTERS THEREFOR, AND PRODUCTS THEREOF
Edward W. Pietrusza, Morris Township, Morris County, and Rudolph Pinter and Jack R. Pedersen, Morristown, N.J., assignors to Allied Chemical Corporation, New York, N.Y., a corporation of New York
No Drawing. Filed Sept. 11, 1962, Ser. No. 222,959
19 Claims. (Cl. 260—37)

This invention relates to process, catalysts, catalyst promoters, and products of lactam polymerization wherein the lactam ring is saturated and in addition to at least one imide group, said lactam ring consists of at least 5 additional atoms, all of which additional ring atoms are carbon atoms. This application is a continuation-in-part of our copending U.S. application Ser. No. 146,449, filed Oct. 20, 1961. Copending U.S. applications Ser. No. 185,537, filed Apr. 6, 1962; and Ser. No. 188,960, filed Apr. 20, 1962, are directed to related subject matter.

The lactams polymerized in accordance with this invention are particularly lactams as above defined bearing on the ring only hydrogen atoms, hydrocarbon substitutents, and/or alkylene bridges between 2 lactam rings; but other substituents can also be present when they do not decompose the catalysts used or otherwise prevent the desired polymerization.

More particularly this invention relates to anionic polymerization of said lactams in presence of a co-catalyst or promoter whereby the polymerization can be effected at temperatures below the softening point of the resulting polymer, and in bulk, i.e., in absence of inert diluents. The rapidity of polymerization possible by use of our invention at temperatures below the polymer softening point, together with absence of volatile by-products, allows production of shaped articles, e.g. molded and extruded articles, directly from liquid monomer by methods such as rotational casting similar to those utilized with vinyl plastisols; by extrusion or injection methods; etc. Moreover by virtue of this same rapid conversion of monomer to solid polymer, a wide variety of additives can readily be incorporated in our polymers, such as fillers, pigments, reinforcing materials, plasticizers, heat and light stabilizers, blowing agents, etc., which can be dissolved or suspended in the monomer or impregnated with the monomer (woven or unwoven glass fibers, etc.), the monomer being then polymerized by our process.

Conditions and metal or metal compound catalysts suitable for anionic polymerization are broadly known, including conditions suitable when a promoter or cocatalyst is present, e.g., in accordance with U.S. Patents 3,015,652, 3,017,391, 3,017,392, 3,018,273, etc. Like conditions and the same metal or metal compound catalysts are applicable in our polymerization processes in accordance with this invention. In particular the temperatures used in our polymerizations are in the range from about 100° C. to about 250° C. and the metal or metal compound catalysts which we use are an alkali metal or alloy thereof or alkaline earth metal including magnesium, or basically reacting compound of said metal such as hydride, amide, oxide, hydroxide, carbonate, salt of a weak organic acid, metallo organic compound, etc.

We have discovered a new class of promoters for anionic polymerization of lactams as above defined. Our promoter or cocatalyst can be defined as a lactam bearing on the imido group a heterocyclic substituent, in which substituent at least one ring atom is nitrogen doubly bonded to a ring carbon atom, said ring carbon atom being tautomerically linked to the imido group of the lactam.

The lactam moiety of our promoter preferably is saturated and has at least 7 ring members, all ring members other than the imido groups being methylene groups; such as for example the residue after removal of imide hydrogen from ε-caprolactam, omega-enantholactam, omega-caprylolactam, omega-laurolactam, a dilactam such as isopropylidene dicaprolactam, etc., especially ε-caprolactam.

The heterocyclic substituent attached in our promoter to the imido group of said lactam moiety can be saturated, unsaturated, or aromatic and can contain one or more further hetero atoms in the ring in addition to nitrogen therein. As above stated, at least one nitrogen atom in this heterocyclic substituent is doubly bonded to a ring carbon atom, and said ring carbon atom is tautomerically linked to the imido group of the lactam moiety. The term "tautomerically" linked has reference to the so-called "tautomeric effect"—see, for example, Hammett's Physical Organic Chemistry (McGraw-Hill, 1940) page 195; by this term we mean that the carbon atom, doubly bonded to nitrogen in the heterocyclic ring, is attached directly to the imido group of the lactam, or is attached thereto by a chain of alternating singly and doubly bonded atoms in the heterocyclic ring, the chain consisting of an even number of such atoms whereby the said carbon doubly bonded to ring nitrogen is conjugated with the imido group.

The heterocyclic ring can have a wide variety of substituents—even including substituents replaceable by the lactam anion of the lactam-metal salt serving as catalyst in the polymerization and substituents containing active hydrogen—provided sufficient metallic catalyst is used in the polymerization to provide adequate catalyst after any reaction of the catalyst with substituents in the promoter. These substituents can be halo, alkoxy, and other replaceable substituents; alkyl, aryl, alkaryl, arylalkyl and other hydrocarbyl substituents; and hydroxyalkyl, amino, amino-alkyl, etc., to the extent these do not eliminate the active catalyst. Amino groups tend to act as terminators in the polymerization. Since our promoters become the starting point of the molecular chains in our polymers, the substituents in the promoters can be chosen for effects, e.g., dyeing, stabilizing against aging, etc., which they impart to the polymer product.

A simple compound illustrative of the promoters of our invention is N-(2-pyridyl)-ε-caprolactam which can be represented as a resonance hybrid of the formulas below (and others);

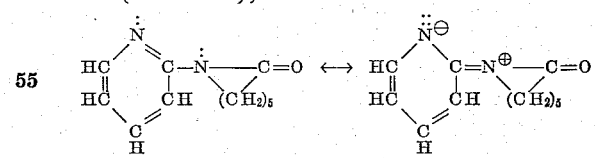

In this compound the lactam moiety is ε-caprolactam, and the heterocyclic substituent is the 2-pyridyl radical. It will be observed that this pyridyl ring in the first formula contains one nitrogen atom doubly bonded to a ring carbon atom, and in the specified 2-pyridyl compound the carbon doubly bonded to nitrogen, i.e., the 2-carbon, is directly linked to the imido nitrogen of the lactam. It will be further observed that this 2-carbon is doubly bonded to the ring nitrogen of pyridine only in one of the tautomeric structures which have been written above as contributing to the resonance hybrid representing pyridine. Such tautomeric double bonds are included within the above definition of our promoters.

A second example of our promoters is N-(4-pyridyl)-

ε-caprolactam wherein the 2-carbon of the 4-pyridyl ring is again doubly bonded (in some of the tautomeric structures) to the ring nitrogen. This doubly bonded 2-carbon atom is conjugated with imido nitrogen of the lactam by the single bond from 2-carbon to 3-carbon, and the double bond from 3-carbon to 4-carbon, 4-carbon being attached by a single bond to the imido nitrogen. Thus in the 4-pyridyl ring, the 2-carbon is tautomerically linked to the nitrogen atom of the imido group, in the sense we use this term. Representative tautomeric structures involved are shown in the formulas below:

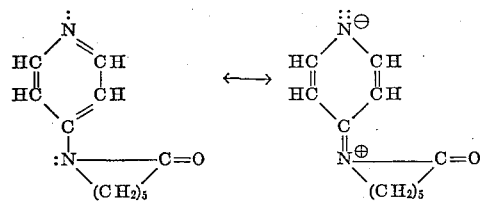

Illustrative of the lactams which can be polymerized in accordance with our invention are ε-caprolactam (7-member ring), omega-enantholactam (8-member ring), omega-caprylolactam (9-member ring), omega-laurolactam (13-member ring) and lactams with 2 or more imide groups in the ring such as the dimer and trimer cyclic lactams of ε-aminocaproic acid, containing respectively 2 imide groups and 14 ring members, and 3 imide groups and 21 ring members, known as oligomers. These lactams can be homopolymerized and also can be copolymerized with each other in accordance with our invention. Moreover these lactams, suitably in major molecular proportions in the reaction mixture, can be copolymerized with dilactams such as those of British Patents 742,479 published Dec. 30, 1955; 824,207 published Nov. 25, 1959; and 880,761 published Oct. 25, 1961; e.g., methylene-bis-ε-caprolactams and isopropylidene-bis-ε-caprolactams in accordance with our invention, to produce cross linked products of low solubility, high fusion temperature, and high impact strength. The above copolymers become translucent to transparent at comonomer content of about 5–25 mol percent, corresponding to lower crystallinity than in the opaque homopolymers. The translucent and transparent polymers show practically no shrinkage in the container or mold when produced therein at temperatures below the polymer softening points in accordance with our process.

Our promoters can be prepared and isolated as pure compounds, or can be prepared in the parent lactam, e.g., as concentrates therein, or can be produced in situ in the polymerization reaction mixture during polymerization. In general our promoters are prepared by reaction between the parent lactam and the heterocyclic compound bearing a substituent reactive with imide hydrogen and/or with a metal salt of the lactam such as the lithium salt; this reactive or replaceable substituent being on at least one carbon atom doubly bonded to nitrogen, or on a carbon atom connected to said carbon by a conjugating chain as above defined. Examples of suitable substituents are chloro, bromo, iodo, alkoxy, aryloxy, arylalkoxy, hydroxy, alkylamino, dialkylamino, anilino, alkylthio, arylthio, arylalkylthio, alkarylthio, mercapto, etc.

The parent lactams which we have found best suited for production of our promoters are the saturated, unsubstituted lactams having one imide group in the ring and 7–13 ring members.

Among parent heterocyclic compounds which we have found very suitable are the triazines such as in particular 2- and/or 4- and/or 6-chloro- and/or phenoxy- and/or methoxy-triazines of our copending application Ser. No. 146,449, filed Oct. 20, 1961; the 3- and/or 6-chloro- and/or phenoxy- and/or methoxy-pyridiazines of copending application Ser. No. 185,537, filed Apr. 6, 1962, and the 2- and/or 4- and/or 6-chloro- and/or phenoxy- and/or methoxy-pyrimidines and 2-chloro-pyrazines of copending application Ser. No. 188,960, filed Apr. 20, 1962. The disclosures of said copending applications are to be understood as being incorporated herein and made a part hereof.

Additional specific examples of suitable classes of heterocyclic compounds for production of our promoters are 2- and 4-pyridyl compounds, e.g., 2-chloropyridine, 4-chloropyridine, 2-phenoxypyridine, 4-phenoxypyridine, 2-methoxypyridine and 4-methoxypyridine; and the corresponding fused ring compounds, e.g., the quinolines such as 2-chloroquinoline, 4-chloroquinoline, etc.; the quinoxalines such as 2,3-diphenoxyquinoxaline; the oxazoles such as benzoxazoles, e.g., 2-chlorobenzoxazole, 2-phenoxybenzoxazole, 2-methoxybenzoxazole; the thiazoles such as benzothiazoles, e.g., 2-chlorobenzothiazole, 2-phenoxybenzothiazole, 2-methoxybenzothiazole; and similarly for the pyrazoles, the oxazines, etc.

As above stated, hydroxy groups are an example of groups which are often sufficiently reactive with imido hydrogen or with metal salts of lactams for the purposes of our invention. Accordingly the hydroxy-substituted heterocyclics of the above outlined types can often be used for the purposes of our invention, although generally they form an active catalyst system more slowly with lactam metal salts than do halo, alkoxy, or aryloxy substituents in the heterocyclic compound. It will be recognized that in general these hydroxy derivatives represent the enolic form of an imide. For example the 2-hydroxy-2-oxazolines represent the enol forms of the 2-oxazolidinones. Thus the readily enolized imides can be used as parent heterocyclic compounds in forming our promoters.

Another illustration of a class of promoters of our invention is N-(2-caprolactim)-ε-caprolactam, believed to be the active promoter when di-(ε-caprolactim)-O-ether is used in accordance with copending application of Lund et al., Serial No. 232,279, filed October 22, 1962, now abandoned. This N-(2-caprolactim)-ε-caprolactam contains a heterocyclic substituent saturated except for the double bond between carbon and nitrogen as shown by the formula therefor:

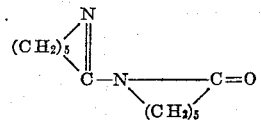

In one of the best modes contemplated by us for carrying out our invention, the lithium salt of ε-caprolactam is used as the anionic polymerization catalyst as an essentially pure product, or as a concentrate of about 60% by weight in caprolactam. This material can be prepared as follows:

*Example A*

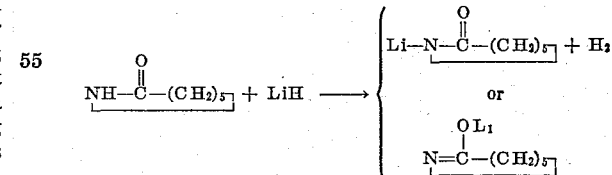

Under a blanket of dry, oxygen-free nitrogen 0.7 mol of lithium hydride was added to 10 mols of distilled, dry caprolactam at 90–110° C./750 mm. and the pressure was reduced to below 10 mm. Use of higher temperatures or use of much more than 10 molecular proportions of lithium hydride per 100 of caprolactam results in solidification of the reaction mixture and partial polymerization of the lactam, as also does the use of atmospheric rather than reduced pressures, we have found. A 2-liter resin flask was equipped with appropriate fittings and immersed in a heated oil bath. To insure a uniform dispersion and reaction of the LiH, a magnetic stirrer was used, which avoided air leaks during the low pressure operations.

A vigorous reaction occurred and after 1 to 2 hours the evolution of hydrogen had virtually ceased. A further reduction in pressure and a slight increase in temperature (110–120° C./1.0–0.1 mm.) allowed caprolactam to be distilled. Distillation proceeded until the still residue contained 20 to 70 atomic proportions of lithium per 100 molecular proportions of caprolactam present (free and as lithium salt). Concentrations in these units of atomic proportions of lithium are sometimes designated for brevity hereinafter as mols of lithium per 100 mols caprolactam, or mol percent lithium salt concentrate in caprolactam.

The concentrate was then cooled to room temperature and in a dry atmosphere (nitrogen) was ground to a free-flowing powder. The powdered concentrate was placed in a distillation vessel under dry nitrogen and heated at 100–120° C./1.0–0.1 mm. for a period of 3 to 5 hours to remove caprolactam. The white solid that was obtained melted with decomposition at 320–345° C., and was found by infrared and elemental analysis to be the lithium salt of $\epsilon$-caprolactam. This salt was hygroscopic but stable in air, in absence of moisture and carbon dioxide, and was completely soluble in water.

Example B

An alternative procedure is as follows:

4 liters of distilled, dry xylene and 136 gms. (1.2 mols) of distilled, dry caprolactam were introduced into a 5-liter 3-necked flask, heated with an electric mantle and equipped with a mechanical stirrer, reflux condenser, and the necessary gas lines. A dry, nitrogen atmosphere was maintained throughout the operation. The solution was heated to 90–100° C./750 mm. and under a blanket of dry, oxygen-free nitrogen, 7.9 gms. (1.0 mol) of lithium hydride was added with stirring. Reaction proceeded as indicated by the evolution of hydrogen and the precipitation of a flocculent solid. Slowly the temperature was raised to 140° C. and with stirring the reaction was allowed to continue for 2 hours until the evolution of hydrogen had subsided.

The reaction mixture was cooled to room temperature and filtered under a blanket of dry nitrogen. The isolated precipitate was washed twice with 200 cc. of dry, hot benzene and then heated under reduced pressures for 24 hours at 80–90° C./5–10 mm. nitrogen. There was obtained 110 gms. (92.5% yield) of a white product (M.P. (dec.) 310–340° C.), which was found by infrared and elemental analysis to be the lithium salt of $\epsilon$-caprolactam (hygroscopic but stable in air, in absence of moisture and carbon dioxide).

Further, in the best mode contemplated by us of carrying out our invention, our promoter is prepared in advance of the polymerization and used as a pure compound or as solution or suspension in excess lactam, e.g., caprolactam or the lactam to be polymerized. Alternatively the parent heterocyclic compound can be added under polymerization reaction conditions to form our promoter and a co-product, e.g., lithium chloride, etc., in the polymerization in situ in reaction mixture.

The preparation of our promoter is typically effected by heating, e.g., a chloro, phenoxy, or methoxy heterocyclic parent compound with the lactam to be polymerized or with caprolactam, or with a solution or suspension of, e.g., lithium salt of said lactam. The product of methathesis such as hydrogen chloride, methanol, lithium chloride or lithium hydroxide is volatilized or precipitated or removed via formation of, e.g., a lactam hydrochloride. This reaction can be conducted in the lactam as diluent with distillation of the lactam at reduced pressure to concentrate the reaction products and remove any water and/or volatile metathesis products; or can be conducted using a concentrated metal salt, e.g., lithium salt of the lactam in excess lactam or in an inert solvent such as benzene or xylene. The resulting reaction products can be worked up to purify the desired promoter compound, or can be partially purified, or used as obtained from the reaction.

Example C

Lithium salt of caprolactam in caprolactam was prepared essentially as above described in Example A above, from 0.044 mol lithium hydride in 1.06 mols caprolactam; and the resulting reaction mixture was brought to 80° C. under atmospheric pressure of dry nitrogen. Cyanuric chloride (i.e., 2,4,6-trichloro-s-triazine) in amount of 0.0146 mol was slowly added, and about ¾ of the caprolactam originally charged was distilled off at 110° C./0.2 mm. under dry nitrogen.

The solid residue analyzed by infrared was identified as caprolactam and an N-(triazino)-$\epsilon$-caprolactam.

Example D 30 grams of essentiailly pure lithium salt of $\epsilon$-caprolactam prepared as in Example B above (0.25 mol) was added to a slurry of 9.2 grams of 2,4,6-trichloropyrimidine (0.05 mol) in dry benzene under dry nitrogen, with stirring for 2 hours at 70° C. The solid residue (excess lithium salt of caprolactam and LiCl) was filtered off. Upon evaporating the benzene at reduced pressure an oil was obtained which crystallized on standing. It was recrystallized from n-heptane and showed melting point of 148°–154° C. Analysis for carbon hydrogen and nitrogen closely checked the theoretical for substitution of the 3 chlorine atoms by 3 caprolactam residues, i.e., for 2,4,6-(tri-$\epsilon$-caproylimido)-pyrimidine. Infrared examination checked this structure, showing the pyrimidine and caprolactam nucleus and absence of chloro substituents.

Example E

N-(triazino)-$\epsilon$-caprolactam was prepared directly from caprolactam and cyanuric chloride by heating 46 parts by weight of dry, distilled caprolactam with 3.6 parts of cyanuric chloride under agitation produced by a nitrogen bubbler from 100° C. slowly up to 230° C. and holding one-half hour. Hydrogen chloride was evolved. The temperature was lowered to 140° C., the pressure was reduced, and 20 parts of caprolactam was distilled off.

The solid residue analyzed by infrared was identified as caprolactam and an N-(triazino)-$\epsilon$-caprolactam (no unreacted chlorotriazine groups).

Example F

To 7.77 parts 2-chlorobenzoxazole (0.05 mol) dissolved in 120 parts benzene were slowly added 6 parts of the substantially pure lithium salt of caprolactam (0.05 mol) as made in Example B above, with stirring at room temperature and under dry nitrogen. The temperature rose to 60° C. After 1½ hours, when the temperature had fallen to 40–50° C., the reaction mixture was filtered. The filtrate was evaporated under reduced pressure to a dry gummy solid which was then extracted into petroleum ether, from which a solid product with melting point about 81° C. crystallized on standing. This material showed by infrared examination the caprolactam and benzoxazole nucleus, and absence of chloro substituent; and was identified as N-(2-benzoxazolyl)-$\epsilon$-caprolactum.

Example G

To 17.6 parts 2-chlorobenzothiazole (0.105 mol) dissolved in 450 parts dry xylene, was added gradually at 100° C. with agitation 15.0 parts (0.125 mol) lithium salt of caprolactam prepared as in Example B above, all under an atmosphere of dry nitrogen. The mixture was heated to 100–110° C. for 2 hours, filtered hot to separate unreacted lithium salt of caprolactam and LiCl; and the solvents removed from the filtrate by evaporation under reduced pressure. The residue was extracted into hot ligroin at 90–100° C. The ligroin solution was cooled whereupon a solid product crystallized having melting point of 128–132° C. Its infrared absorption spectrum clearly showed the presence of the caprolactam nucleus and absence of chloro substituent, and the ultraviolet spectrum showed the benzothiazole nucleus. The compound was identified as N-(2-benzothiazolyl)-ε-caprolactam.

In the polymerization of lactams using our promoters, our promoters interact with the anionic catalysts, probably with the catalyst in the form of a lactam salt of the catalytic metal, whereby polymerization is initiated by cleavage of the N–C bond in the imido group of our promoters and attachment of the lactam moiety of the catalyst to the resulting carbonyl end group; the process being continued stepwise via exchange of the metal cation in the polymer chain for hydrogen in a monomer imido group. The overall process using a triazine promoter can represented by the following equation wherein R and R' are imido substituents, or any other non-interfering substituents:

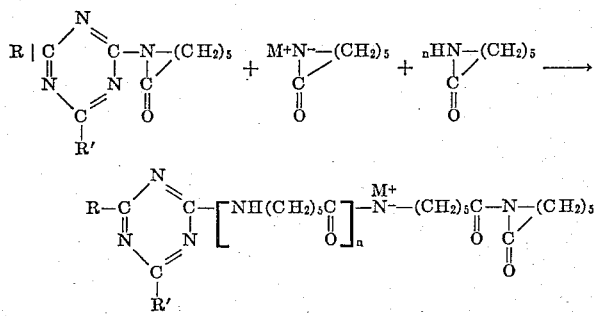

When our promoter is formed in situ in a reaction mixture containing the anionic catalyst, it will be recognized that consumption of the anionic catalyst by the reaction forming the promoter must be allowed for, as above pointed out in the discussion of substituents which can be present in the promoter.

The ratio of atom equivalents of metal in the anionic catalyst: equivalents of the heterocyclic-substituted imido groups of our promoter, to be supplied in the polymeriztion reaction mixture, can vary widely. In general the polymer molecular weight will tend to be higher, and the polymerization rate will be lower at the lower metal:promoter ratios and at lower promoter concentrations since these conditions tend to favor chain growth steps of the above Equation 1 over the chain initiation step. Suitable ratios of equivalents of metal in the catalyst: equivalents of heterocycle-substituted imido groups of our promoter to be supplied are in the range from about 0.1:1 to about 20:1 or higher. Suitable promoter concentrations are as usually employed where catalytic effects are involved, e.g., in the range 0.01–10 equivalents of heterocycle-substituted imido groups per 100 mols of the lactam being polymerized.

Suitable temperatures for use in our polymerizations are above the melting point of the lactam monomer and generally in the range from about 100° C. up to about 250° C. To protect the active anionic catalyst against conversion to inactive compounds it is necessary to protect the reaction system from substances such as water, carbon dioxide and like susbtances reactive with metal salts of imides. Dry nitrogen represents a suitable atmosphere, and dry air substantially free of carbon dioxide can also be used as atmosphere over the reaction mixtures in which metal salts of imides are present.

The monomer to be polymerized is well mixed under inert atmosphere above its melting point with anionic catalyst, e.g., lithium salt of a lactam and with promoter added with the catalyst or separately, as such or as the parent heterocyclic compound from which promoter is formed in situ. The temperature can be brought to polymerization temperature by heating or by using a hot dispersion of one ingredient, say the promoter, in the lactam above the polymerization temperature, to be mixed with the other ingredient in lactam below the polymerization temperature. Addition of promoter to catalyst and lactam will be preferred to obtain highly linear polymer, particularly promoter containing only one imido group linked to the heterocyclic ring, such as oxazoles and thiazoles.

When our process is used to produce shaped articles directly in a mold or by injection or extrusion, etc., it is usually desirable to allow time for any bubbles to escape from the liquid reaction mixture before polymerization begins. Accordingly in such operations the mixing will usually be accomplished below the polymerization temperature, and after escape of any bubbles the mixture will be heated enough to start the polymerization. Removal of bubbles can be accelerated by rotation of the container or mold, allowing bubbles to escape above the center of rotation. Rotation can then be discontinued, e.g., for production of solid shaped articles; or can be maintained, especially for production of hollow shaped articles. Since there are no volatile by-products to be released the mold can be entirely closed. Materials can be advantageously incorporated with polymer by dispersion in the monomer and polymerization by our process forming useful compositions and shaped articles. Polymer compositions and articles thus formed include for example sand (75% by weight); carbon black (1% by weight); aluminum filings (about 50% by weight); glass wool, impregnated with monomer and our catalyst promoter system in the form of a tube wrapped around a core, and heated in a nitrogen atmosphere at 175° C. to form a reinforced tube; barium carbonate azide blowing agent (1–5% by weight) forming a foamed article; etc.

The following examples are illustrative of representative species of our invention and describe completely specific embodiments of our invention, but the invention is not to be interpreted as limited to the details or the species of the examples.

*Example 1*

To 38 grams (0.336 mol) of distilled, dry caprolactam at 160° C. was added while bubbling dry nitrogen through, 1.30 grams of powdered lithium salt of ε-caprolactam prepared by the method of Example A above and containing 26 mols of lithium per 100 mols of caprolactam, i.e., amounting to 0.0204 gram or 0.00295 mol of lithium and 1.28 grams or 0.0113 mol of caprolactam. When this material was completely dissolved or dispersed, 0.650 gram of our N-(triazino)-ε-caprolactam promoter preparation in caprolactam of Example C above was added, and dispersed by the bubbling nitrogen. Based on the cyanuric chloride content of the original preparation, this material contained about 0.001 equivalents of our substituted imide promoter. As the reaction mixture began to thicken and gel, in about 5 minutes, the bubbler was withdrawn so that the reaction mixture would be bubble-free. Dry nitrogen atmosphere was maintained over the reaction mixture.

The reaction mixture had completely solidified to an opaque mass, slightly shrunken from the vessel walls, about 20 minutes after addition of the promoter. The mass was held in the vessel an additional 10 minutes at 160° C., then removed and allowed to cool. It duplicated the shape of the vessel, and was a tough, opaque, off-white solid.

The solid polymer was ground to pass 20 mesh (U.S. Standard Screen Scale of Sieves), i.e., 840 micron openings and a weighed sample of the powder was boiled with 50 volumes of water for 3 hours to extract water-soluble ingredients, then vacuum dried at about 55° C./1 mm.–70° C./10 mm. in dry nitrogen for 24 hours, and weighed at room temperature. The percent extractable (monomer and low polymers) was determined by difference of the weighings as about 3% by weight. The washed, dried polymer was insoluble in meta-cresol and melted about 216–224° C. as observed by loss of form of particles in a sealed capillary tube.

*Example 2*

(A) A like polymerization was performed except that the N-(triazino)-ε-caprolactam in caprolactam preparation of Example E above was used, the quantities of ingredients in the reaction mixture being:

ε-caprolactam—49.0 grams (0.434 mol)
26 mol percent lithium salt of caprolactam in caprolactam concentrate—1.70 grams (0.00385 mol lithium)
N-(triazino)-ε-caprolactam in caprolactam preparation of Example E—0.280 gram (about 0.0005 equivalent of our substituted imide promoter)

The procedure and results were similar to those of Example 1, except that the resulting washed and dried polymer was soluble in meta-cresol and showed reduced viscosity therein, at about 0.5 gram per 100 cc. concentration, and 25° C., of 5.0 deciliters per gram. It melted at about 219°–225° C. The extractable content removed by washing was about 8.5% by weight. The lower completeness of polymerization in the approximately ½ hour at 160° C. compared to Example 1, and the solubility in m-cresol are probably due to use of a smaller proportion of promoter in this example.

(B) Using essentially the same procedure as in part (A) above, but employing 0.160 gram (0.0004 mol) of the 2,4,6-(tri-ε-caprolylimido)-pyrimidine product of Example D above instead of the N-(triazino)-ε-caprolactam of part (A) of this example, gelling occurred in 2 minutes. The product was obtained in the form of a solid cylinder, slightly shrunken from the vessel walls, reproducing the interior shape of the reaction vessel. It was insoluble in formic acid and meta-cresol.

*Example 3*

ε-Caprolactam was distilled at 100–115° C. under 3.5 mm. Hg absolute pressure. 39 parts (0.345 mol) of the fresh distillate was heated to 165° C. and 0.77 part lithium salt of caprolactam in caprolactam concentrate, containing 45 mols of lithium per 100 mols caprolactam and prepared in accordance with Example A above, was added under a dry nitrogen atmosphere. The lithium amounted to about 0.003 mol. When a clear solution was obtained 0.19 part (about 0.00083 mol) of N-(2-benzoxazolyl)-ε-caprolactam of Example F above was added. The mixture rapidly became viscous and was apparently solid in about 10 minutes. After 20 minutes it was cooled and ground to about 20 mesh particle size. It was an off-white hard and tough resin containing 8.2% water extractable material obtained by washing 3 hours with 50 volumes of boiling water. The dried product had a melting point of 215–225° C. and a reduced viscosity of 2.6 deciliters per gram (0.130 gram in 75 cc. meta-cresol at 25° C.).

The presence of a benzoxazole nucleus in the polyamide thus produced was confirmed by examination of the ultraviolet spectrum of said polyamide. A dilute solution of the polyamide in sulfuric acid at room temperatures exhibited a maximum absorption band at 242 millimicrons and minimal absorption at 280 and 274 millimicrons, substantially the same regions at which the benzoxazole nucleus shows maximum and minimal absorptions. Examination of a poly-ε-caproamide prepared by conventional anionic polymerization technique using lithium hydride as the sole catalytic agent revealed no similar absorption behavior in these regions. The polyamide of this example accordingly had essentially the structure

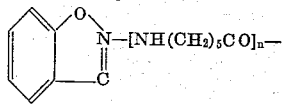

where the end group can be a caprolactam group:

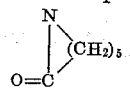

or the hydrolysis product thereof, i.e.,

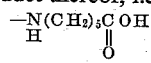

etc.

*Example 4*

By essentially the same technique as described in Example 3, a polymerization was carried out using:

43 parts ε-caprolactam (0.38 mol)
0.15 part lithium salt of ε-caprolactam prepared substantially pure by the procedure of Example B above (0.00125 mol).
0.135 part 2-chlorobenzoxazole (about 0.0009 mol)

The water extractable content of the final polycaproamide thus obtained was 8.2% by weight and the reduced viscosity was 5.24 deciliters per gram (0.130 g. in 75 cc. meta-cresol at 25° C.).

In this example the active promoter is believed to be formed by reaction of the chloro substituent in benzoxazole with the lithium (or possibly to some extent hydrogen) on a caprolactam imido nitrogen, producing N-(2-benzoxazolyl)-ε-caprolactam in situ.

*Example 5*

4.7 parts phenol and 2 parts sodium hydroxide were added to 100 parts water. To this solution at room temperature and under an atmosphere of nitrogen was slowly added with agitation, a solution of 7.5 parts 2-chloro benzoxazole in 80 parts acetone. The temperature rose to 55° C. Stirring was continued for 2 hours. The resulting oil phase was separated and distilled under reduced pressure. The fraction boiling around 126° C. at 0.6 mm. Hg was found to show absorption in its infra red spectrum indicating the presence of both phenyl and oxazole groups. This product was identified as 2-phenoxybenzoxazole.

By the same technique as described in Example 3, polymerization was carried out using:

45 parts ε-caprolactam (0.40 mol).
1.52 parts lithium salt of caprolactam concentrate in caprolactam prepared per Example A (as a 26 mol percent solution in caprolactam) amounting to 0.00345 mol of lithium.
0.20 part 2-phenoxy benzoxazole (0.00095 mol).

A light yellow solid was obtained by 7 minutes of heating at 163° C. Water extractable content of this solid (resin) polycaproamide was 7.6% and reduced viscosity (0.043 gram in 25 cc. meta-cresol at 25° C.) was 3.0 deciliters per gram.

*Example 6*

55 parts (0.44 mol) of ε-caprolactam and 0.880 gram lithium salt of caprolactam concentrate in caprolactam (55 mol percent lithium salt) prepared as in Example A above were heated at 160° C. under a dry nitrogen atmosphere until a clear solution was obtained. To this solution of lithium salt of caprolactam in caprolactam (0.0042 mol of lithium) was added 0.86 gram (0.0035 mol) of N-(2-benzothiazolyl)-ε-caprolactam from Example G above. The temperature was kept at 160° C. The mixture became a stiff gel in 2 minutes and crystallized in 8 minutes to an opaque solid. After ½ hour the mass was cooled. It was a solid cylinder reproducing the interior shape of the reaction zone. The polymer was light yellow, hard and tough, soluble in formic acid and meta-cresol.

*Example 7*

100 parts ε-caprolactam (0.88 mol) and 0.07 part lithium hydride (0.0088 mol) were heated at 150° C. under a dry nitrogen atmosphere until the hydrogen evolution ceased. The temperature was lowered to 100° C. and 0.15 part 2-chloro-benzothiazole (0.00088 mol) was added and the mixture heated to 160° C. In about 20 minutes an opaque solid polymer had formed. After another 15 minutes heating it was cooled. It was an off-white, hard, tough cylinder reproducing the interior shape of the reaction zone.

After grinding to about 20 mesh fineness and treating 3 hours with 50 volumes of boiling hot water 5.48 percent by weight of the polymer had been extracted by the water. The dried polymer then had a melting point of 215°–225° C. and a reduced viscosity of 4.5 deciliters per gram as measured for a 0.043 gram solution in 25 cc. metacresol at 25° C. Under ultraviolet light the sulfuric acid solution of the polymer at room temperature showed a maximum absorption at 265 millimicrons, and minimal absorption at 284 and 292 millimicrons, showing presence therein of the benzothiazole group. The polymer was identified as 2-(N-poly-ε-caproamido)-benzothiazole.

*Examples 8–17*

The following oxazoles, when substituted for the benzoxazoles used in Examples 3–5 under otherwise the procedure and conditions of each of said examples, give similar results to those of each said example:

Example 8—2-methoxy-benzoxazole
Example 9—2-ethoxy-benzoxazole
Example 10—5-methyl-2-oxazolidinone, the keto form of 2-hydroxy-2-oxazoline
Example 11—2-methylthio-benzoxazole
Example 12—2-ethylthio-benzoxazole
Example 13—2-phenylthio-benzoxazole
Example 14—2-benzyloxy-benzoxazole
Example 15—2-chloro-beta-naphthoxazole
Example 16—2-methylthio-beta-naphthoxazole
Example 17—2,2'-dibenzoxazolyl glycol ether The thiazoles having the same or similar substituents as in the above benzoxazoles give similar results to those obtained in Examples 6 and 7 above, when substituted for the benzothiazole of said examples, using otherwise the procedure and conditions of each of Examples 6 and 7 above.

*Example 18*

This example illustrates use of a promoter compound in which a substituent is present to impart permanent modification of properties to the polymer by incorporation of the promoter in the polymer molecule.

ε-Caprolactam containing less than 50 p.p.m. water was prepared by distilling said caprolactam at 100–115° C. under 3–5 mm. Hg pressure. The dry caprolactam thus obtained was admixed with lithium hydride under anhydrous conditions in proportions of 0.84 mol lithium hydride per 100 mols caprolactam. The resulting mixture was then heated at 160° C. for a period of 2 hours under a dry nitrogen blanket until evolution of hydrogen ceased, indicating completion of reaction and production of 0.84 mol of lithium salt of caprolactam per 100 mols of caprolactam.

Under constant agitation, the resulting dispersion was heated to a temperature of 180° C. and there was added, per 100 mols of caprolactam, about 0.04 mol of 2,4,6-triphenoxy-s-triazine and about 0.04 mol of 2-(p-benzene azo anilino)-4,6-dichloro-s-triazine of formula:

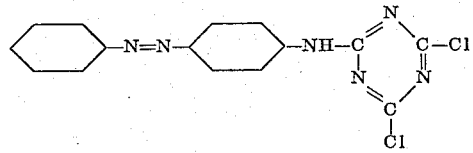

(prepared from aminoazobenzene and cyanuric chloride). In the triazine compounds used, the 3 phenoxy groups and the 2 chloro atoms are readily reactive with the lithium salt of caprolactam under the conditions employed, so that these groups and atoms are believed to be largely or entirely replaced by caprolactam groups to form an N-triazino caprolactam initiator or promoter of this invention. The aminoazobenzene group is much less reactive and appears to become incorporated in the molecules of the polymers initiated with the aminoazobenzene-dichlorotriazine.

The resulting polycaproamide was deep orange-red throughout, and the color appeared to be non-extractable. The polymer was tough and opaque. Thorough extraction with hot water removed about 4% by weight of the product, representing unpolymerized monomer and low polymers. The melting point of the water-extracted and dried polymer was 220° C.

*Examples 19–23*

The following examples illustrate variations in the lactams which can be homopolymerized and copolymerized in accordance with our invention. The procedure and conditions were as in Example 18 above except as otherwise indicated. Translucency or transparency of the product indicates lower crystallinity than in the opaque products.

| Ex. | A | | B | C | D | E | F |
|---|---|---|---|---|---|---|---|
| 19 | $(CH_2)_6$—NH—C=O | | 100 | 1 | 0.2 | 180° | O-W, Oq, T; 225°–231°; 6.5 dl./g | 3 hrs.; 4%. |
| 20 | $(CH_2)_6$—NH—C=O | 25 | } 1 | 0.2 | 180° | Lt-Y, Tl, T; 189°–195°, insol. in m-cresol. | 3 hrs.; 6–7%. |
|  | ε-Caprolactam | 75 | | | | | |
| 21 | $(CH_2)_7$—NH—C=O | | 100 | 1 | 0.2 | 160° | Lt-Y, Oq, T; 195°–202°; insol | 22 min.; 2%. |
| 22 | $(CH_2)_7$—NH—C=O | 15 | } 1 | 0.2 | 160° | P-Y, Tl, T; 201°–208°; insol | 1 hr.; 3–4%. |
|  | ε-Caprolactam | 85 | | | | | |
| 23 | $(CH_2)_{11}$—NH—C=O | 20 | } 0.84 | 0.08 | 160° | P-Y, Tl, T; 202°–213°; insol | 1 hr.; 8–9%. |
|  | ε-Caprolactam | 80 | | | | | |

A = Lactams polymerized and mol percent in starting mixture.
B = Mol LiH per 100 mols lactam.
C = 2,4,6-triphenoxy-s-triazine, mol per 100 mols lactam.
D = Polymerization temperature, ° C.
E = Appearance[1] of hot water extracted, dried polymer, M.P.,[2] viscosity.[3]
F = Approximate time of solidification and weight percent hot water extractables in product.

[1] Lt-Y = Light Yellow or Tan.
P-Y = Pale Yellow.
O-W = Off-White.
Oq = Opaque.
T = Tough.
Tl = Translucent.
Tp = Transparent.
[2] Melting Point, ° C. (loss of form of particles in sealed tube).
[3] Reduced Viscosity at 0.1728 g./100 cc. in m-cresol, 25° C., in deciliters per gram.

As can be seen from Examples 19–23 above, the process of our invention is generally effective for lactams having at least 7 members in the ring. Under similar conditions, however, lower lactams were found to homopolymerize and copolymerize with caprolactam only in poor yields in that more than 50% of the product in such tests was hot water extractable.

When 2,4,6-trimethoxy-s-triazine is substituted for the 2,4,6-triphenoxy-s-triazine as the parent compound for the promoter or initiator using otherwise the procedure and conditions of each of the above Examples 19–23, similar results are obtained to those of each of said example. Like results are also obtained upon substituting parent compounds with mixed groups, e.g., chloro-dimethoxy-s-triazine, for the triphenoxy triazine compounds in Examples 19–23.

A particular advantage of using 2,4,6-trimethoxy-s-triazine and like parent compounds for forming our promoters is that in admixture with, e.g., caprolactam they exercise a stabilizing effect on the caprolactam at elevated temperatures, such as 130° C.–200° C. Thereby caprolactam as shipped can be admixed with such compound and heated to a temperature above the desired polymerization temperature and partially distilled for drying without adverse effect on color or polymerizability.

*Example 24*

Dilactams, wherein 2 lactam rings are joined by a bridge, e.g., an alkylene radical, can be copolymerized with lactams by our process to form modified polymers which are translucent or transparent and relatively high melting or infusible indicating a cross-linked structure. We have obtained such product starting from mixtures of about 5–25 mol percent of isopropylidene-di-$\epsilon$-caprolactam with $\epsilon$-caprolactam by the procedure and under the conditions of Example 18 above, using in situ, as the parent compound for forming the promoter, 2,4,6-triphenoxy-s-triazine. The resulting polymers are more rubbery than the $\epsilon$-caprolactam homopolymers of the above examples and have higher impact strength and greater transparency than similarly produced $\epsilon$-caprolactam homopolymers.

We claim:

1. In a process for the polymerization of a lactam having a saturated ring, said ring consisting of at least one imide group and at least 5 additional atoms, all of which ring atoms other than those of the imide groups are carbon atoms, said polymerization being catalyzed by a metal catalyst suitable for anionic polymerization, being at temperature in the range from about 100° C. to about 250° C., and being in a reaction system protected from substances reactive with metal salts of imides: the improvement which comprises employing in the reaction mixture, as promoter, a lactam as above defined and bearing on its imido group a substituent of the group consisting of 2-oxazolyls and 2-thiazolyls.

2. Process of claim 1 wherein the polymerization is in bulk at temperature above the melting point of the lactam monomer and below the softening point of the resulting polymer and is continued until the resulting polymer mass is solid and reproduces the interior shape of the polymerization zone.

3. Process of claim 1 wherein the lactam-heterocyclic promoter of claim 1 is added as such in the reaction mixture.

4. Process of claim 1 wherein said promoter is produced in situ in the reaction mixture by supplying to the reaction mixture an oxazole which bears in the 2-position a substituent reactive with the lactam under the above defined polymerization conditions of claim 1.

5. Process of claim 1 wherein said promoter is produced in situ in the reaction mixture by supplying to the reaction mixture a thiazole which bears in the 2-position a substituent reactive with the lactam under the above defined polymerization conditions of claim 1.

6. In a process for the polymerization of a lactam having a saturated ring, said ring consisting of at least one imide group and at least 5 additional atoms, all of which ring atoms other than those of the imide groups are carbon atoms, said polymerization being catalyzed by a metal catalyst suitable for anionic polymerization, being at temperature in the range from about 100° C. to about 250° C., and being in a reaction system protected from substances reactive with metal salts of imides: the improvement which comprises employing in the reaction mixture, as promoter, an oxazole, bearing thereon a substituent of the group consisting of alkylthio, arylthio, arylalkylthio, alkarylthio, and mercapto; the amount of said promoter supplied being in the range of about 0.01 to 10 equivalents of thio groups per 100 mols of lactam supplied.

7. In a process for the polymerization of a lactam having a saturated ring, said ring consisting of at least one imide group and at least 5 additional atoms, all of which ring atoms other than those of the imide groups are carbon atoms, said polymerization being catalyzed by a metal catalyst suitable for anionic polymerization, being at temperature in the range from about 100° C. to about 250° C., and being in a reaction system protected from substances reactive with metal salts of imides: the improvement which comprises employing in the reaction mixture, as promoter, a thiazole, bearing thereon a substituent of the group consisting of alkylthio, arylthio, arylalkylthio, alkarylthio, and mercapto; the amount of said promoter supplied being in the range of about 0.01 to 10 equivalents of thio groups per 100 mols of lactam supplied.

8. In a process for the polymerization of a lactam having a saturated ring, said ring consisting of at least one imide group and at least 5 additional atoms, all of which ring atoms other than those of the imide groups are carbon atoms, said polymerization being catalyzed by a metal catalyst suitable for anionic polymerization, being at temperature in the range from about 100° C. to about 250° C., and being in a reaction system protected from substances reactive with metal salts of imides: the improvement which comprises employing in the reaction mixture, as promoter, a heterocyclic compound selected from the group consisting of s-triazine, oxazole and thiazole, bearing upon a ring carbon atom which is doubly bonded to a ring nitrogen atom, a substituent of the group consisting of alkylthio, arylthio, arylalkylthio, alkarylthio, and mercapto; the amount of said promoter employed being in the range of about 0.01 to 10 equivalents of thio groups per 100 mols of lactam employed.

9. Process of claim 8 wherein the polymerization is in bulk at temperature above the melting point of the lactam monomer and below the softening point of the resulting polymer and is continued until the resulting polymer mass is solid and reproduces the interior shape of the polymerization zone.

10. Process of claim 1 wherein the lactam polymerized consists essentially of $\epsilon$-caprolactam and the promoter present in the reaction mixture is N-(2-benzoxazolyl)-$\epsilon$-caprolactam.

11. Process of claim 1 wherein the lactam polymerized consists essentially of $\epsilon$-caprolactam and the promoter present in the reaction mixture is N-(2-benzothiazolyl)-$\epsilon$-caprolactam.

12. Process of claim 1, wherein reinforcing glass fibers are dispersed in lactam monomer which is polymerized in accordance with claim 1.

13. As a new product, the polyamide from a lactam wherein the lactam ring is saturated and in addition to at least one imide group, said lactam ring consists of at least 5 additional atoms, all of which additional ring atoms are carbon atoms; said polyamide having combined therein as an end group a nucleus of the group consisting of the benzoxazole nucleus and the benzothiazole nucleus, said nucleus being attached to nitrogen of said polyamide at the 2-position of said nucleus.

14. Product of claim 13 having reinforcing fibers incorporated therein.

15. Product of claim 13 having glass fibers incorporated therein.

16. As a new product, 2-(N-poly-$\epsilon$-caproamido)-benzoxazole.

17. As a new product, 2-(N-poly-$\epsilon$-caproamido)-benzothiazole.

18. As a new product, N-(2-benzoxazolyl)-$\epsilon$-caprolactam of melting point about 81° C.

19. As a new product, N-(2-benzothiazolyl)-$\epsilon$-caprolactam of melting point about 132° C.

References Cited by the Examiner

UNITED STATES PATENTS

| | | | |
|---|---|---|---|
| 2,884,414 | 4/1959 | Indest et al. | 260—78 |
| 3,017,391 | 1/1962 | Mottus et al. | 260—78 |
| 3,037,001 | 5/1962 | Becke et al. | 260—78 |
| 3,141,006 | 7/1964 | Kohan | 260—78 |

FOREIGN PATENTS

| | | |
|---|---|---|
| 228,445 | 5/1960 | Australia. |
| 906,512 | 3/1954 | Germany. |

OTHER REFERENCES

Benson et al., Journal American Chem. Soc., vol. 70 (1948), pp. 2115–2118.

WILLIAM H. SHORT, *Primary Examiner.*

LOUISE P. QUAST, *Examiner.*